United States Patent [19]

Feurgard

[11] Patent Number: 4,986,954
[45] Date of Patent: Jan. 22, 1991

[54] DEVICE FOR MEASURING PARAMETERS IN THE CORE OF A NUCLEAR REACTOR IN OPERATION

[75] Inventor: René Feurgard, La Celle Saint Cloud, France

[73] Assignee: FRAMATOME, Courbevoie, France

[21] Appl. No.: 362,537

[22] Filed: Jun. 6, 1989

[30] Foreign Application Priority Data

Jun. 6, 1988 [FR] France .................. 88 07497

[51] Int. Cl.⁵ ............... G21C 17/00; G21C 19/22
[52] U.S. Cl. ............................. 376/254; 376/203
[58] Field of Search ............ 376/254, 352, 204, 203, 376/255, 292

[56] References Cited

U.S. PATENT DOCUMENTS

| | | | |
|---|---|---|---|
| 3,766,005 | 10/1973 | Erkens | 376/254 |
| 3,860,824 | 1/1975 | Stone | 376/254 |
| 4,140,911 | 2/1979 | Todt et al. | 376/254 |
| 4,318,776 | 3/1982 | Proll et al. | 376/254 |
| 4,426,352 | 1/1984 | Bybee | 376/255 |
| 4,708,844 | 11/1987 | Kearton et al. | 376/254 |
| 4,728,479 | 3/1988 | Merkovsky | 376/254 |
| 4,780,267 | 10/1988 | Todt, Sr. et al. | 376/254 |
| 4,917,853 | 4/1990 | Feurgard | 376/255 |

FOREIGN PATENT DOCUMENTS

| | | |
|---|---|---|
| 2832122 | 1/1980 | Fed. Rep. of Germany . |
| 2081077 | 3/1971 | France . |
| 2607309 | 5/1988 | France . |
| 1293109 | 10/1072 | United Kingdom ........ 376/254 |

*Primary Examiner*—Daniel D. Wasil
*Attorney, Agent, or Firm*—Pollock, Vande Sande & Priddy

[57] ABSTRACT

The device comprises a measurement conduit (10) mounted movably in a guide tube connecting the reactor vessel to an instrumentation room which the measurement conduit (10) enters by passing through a sealing nozzle (25). The measurement conduit encloses peripheral sheaths (14) fastened around a central sheath (13). Measuring probes are fastened to the end of cables (16) and mounted movably, each inside a leakproof peripheral sheath (14). The nozzle (25) comprises a leakproof chamber (40). At their ends, each of the peripheral sheaths (14) of the conduit (10) comprises a leakproof passage (50, 50') for the sliding exit of the measurement cable (16) into the chamber (40). Leakproof passge devices (52) for each of the cables (16) are also placed in an exit wall (42) of the chamber (40) of the nozzle (25).

9 Claims, 8 Drawing Sheets

DEVICE FOR MEASURING PARAMETERS IN THE CORE OF A NUCLEAR REACTOR IN OPERATION

FIELD OF THE INVENTION

The invention relates to a device for measuring parameters in the core of a nuclear reactor in operation, and in particular of a pressurized water nuclear reactor.

BACKGROUND OF THE INVENTION

Pressurized water nuclear reactors comprise a vessel which is filled, when the reactor is in operation, with a coolant fluid which consists of water under pressure. The reactor core, consisting of fuel assemblies, is completely immersed in the coolant water.

In the use of nuclear reactors such as pressurized water nuclear reactors, measurements must be made in the core while the reactor is operating. It is necessary, in particular, to carry out measurements of neutron flux at various places along the height of the core, in order to determine the neutron flux or power distribution along the axial direction of the core, which generally corresponds to the vertical direction.

In their central part, the fuel assemblies forming the core comprise an instrumentation nozzle into which can be introduced, throughout the height of the core, a leakproof thimble, inside which a neutron flux measurement probe is moved while the reactor is operating.

The thimbles associated with each of the fuel assemblies in which flux measurements are carried out must be capable of being withdrawn from these assemblies, for example when reloading of the core is carried out. These thimbles are therefore mounted so that they can move and slide inside guide tubes connecting the lower part of the vessel to a measurement room or instrumentation room in which the ends of the thimbles remote from the ends which are introduced into the core are accessible for the movement of the probes, for the collection of the measurement signals and for the movement of the thimbles inside the guide tubes. The movement of the thimbles in the guide tubes is performed merely by pushing or pulling, sufficient clearance being provided to limit the forces to be applied to the thimble, despite the curved shape of the guide tubes over most of their length.

In addition to the movable neutron flux measurement probes, use is also made of a set of flux-measuring devices such as collectrons, placed in a stationary position in the core and at various levels along its height.

Devices for measuring temperature, pressure or level, which are placed in the core at various determined locations, must also be used while the reactor is operating.

In order to simplify the instrumentation of the core and the procedures for using and maintaining this instrumentation, it has been proposed to place all the measuring devices relating to a core assembly in which measurements are carried out inside leakproof supporting and positioning conduit designed similarly to the conduit receiving the movable probe. A conduit of this kind comprises an outer tubular enclosure in which there is mounted, in a central position, coaxially with the enclosure, a sheath or thimble permitting the guidance of a movable probe for measuring neutron flux. Measuring devices such as collectrons are placed in the conduit, around the central sheath and in stationary positions distributed along the length of the conduit.

The conduit for supporting and positioning the measuring devices has a diameter which is slightly smaller than the diameter of a guide tube permitting its movement and connecting the lower part of the vessel to the instrumentation room. The conduit may be placed in the core or withdrawn from the core from the instrumentation room, merely by its end being pushed or pulled. Inside the instrumentation room, the measurement conduit is mounted in a sliding and leakproof manner inside a nozzle which is rigidly integrally attached to the end of the corresponding guide tube.

It is obviously necessary to employ a central thimble and a neutron flux measuring probe which are miniaturized in relation to the prior art, the intrumentation nozzles of the assemblies being the same as those which were intended to receive thimbles alone. Similarly, the passages reserved for the conduits for supporting and positioning measuring devices in the internal structures of the reactor vessel, between the bottom of the vessel and the base of the core, as well as the guide tubes, are the same as those which were employed for guiding the thimbles alone.

These measurement conduits or leads must have sufficient flexibility to be capable of being moved without excessive force by pushing and by pulling inside curved guide tubes connecting the instrumentation room to the bottom of the vessel. The outer enclosure of these measurement conduits or leads must, furthermore, withstand major forces in a fluid at a high temperature and at a high pressure and under irradiation. In particular, this leakproof outer enclosure must withstand the pressure of the primary coolant water which is exerted on its wall while the reactor is in operation.

To avoid subjecting the wall of the measurement conduit to the pressure of the reactor's primary coolant fluid it has been proposed, in applicant's French Patent Application No. 86-16,505, to produce the measurement conduit in such form that it is in contact with the primary fluid on both its outer surface and its inner surface. The measurement conduit is made in the form of an tubular unit comprising lengths of flexible tubing which are connected together by spacers in which peripheral measuring probes are placed. The central thimble placed coaxially relative to the conduit is made in a leakproof form and such as to withstand the pressure of the primary fluid with which it is in contact via its outer wall. The peripheral measuring probes are immersed directly in the primary fluid inside the measurement conduit. The position of the peripheral probes along the length of the conduit is perfectly determined by the position of the spacers connected by variable lengths of flexible metal tubing.

A device of this kind offers the advantage of being capable of being produced in a form which is both flexible and robust and of facilitating placement of the instrumentation in the reactor core.

However, in the case where a peripheral measuring probe has become defective in operation, the entire measurement conduit must be withdrawn from the corresponding guide tube and must be repaired in a workshop, in order to replace it.

Furthermore, the position of the probes cannot be modified, the latter being determined once and for all when the measurement conduit is designed.

Lastly, the guide tubes towards the various assemblies in which measurements are carried out are of different lengths and require customizing of the design of the measurement conduits. This necessity creates problems which are difficult to solve in the context of the manufacture, storage and replacement of the measurement conduits.

SUMMARY OF THE INVENTION

The purpose of the invention is therefore to provide a device for measuring parameters in the core of a nuclear reactor in operation, immersed in a reactor coolant fluid filling the vessel, comprising a measurement conduit externally and internally in contact with the coolant water, inside which are placed, in a central position and in a coaxial manner, a closed and leakproof sheath for guiding a movable probe for measuring neutron flux and, in peripheral positions, a plurality of probes for measuring physical parameters of the core, the measurement conduit being mounted movably in a guide tube connecting the reactor vessel to an instrumentation room which the measurement conduit enters by passing in a sliding and leakproof manner through a sealing nozzle integrally attached to the end of the guide tube, this measurement device making it possible to perform easily the replacement and the positioning of the peripheral measuring probes and to employ a single type of measurement conduit to equip all the guide tubes of the reactor.

For this purpose, the peripheral measuring probes are fastened to the end of flexible measurement and movement cables; they are mounted movably, each inside a leakproof peripheral sheath, a plurality of peripheral sheaths being mounted inside the measurement conduit around the central sheath in a helical arrangement, and the nozzle comprises a leakproof chamber isolated in respect of the primary coolant fluid and of the instrumentation room into which there open the peripheral sheaths of the conduit, each of which comprises, at its end, a leakproof passage for the sliding exit of the measurement cable and of the corresponding probe into the chamber, leakproof passage devices for each of the cable-probe units also being placed on an exit wall of the chamber of the nozzle.

BRIEF DESCRIPTION OF THE DRAWINGS

In order that the invention may be more clearly understood, a description will now be given, by way of example and with reference to the attached drawings, of a measurement device according to the invention for a pressurized water nuclear reactor.

DESCRIPTION OF PREFERRED EMBODIMENT

Figure 1:
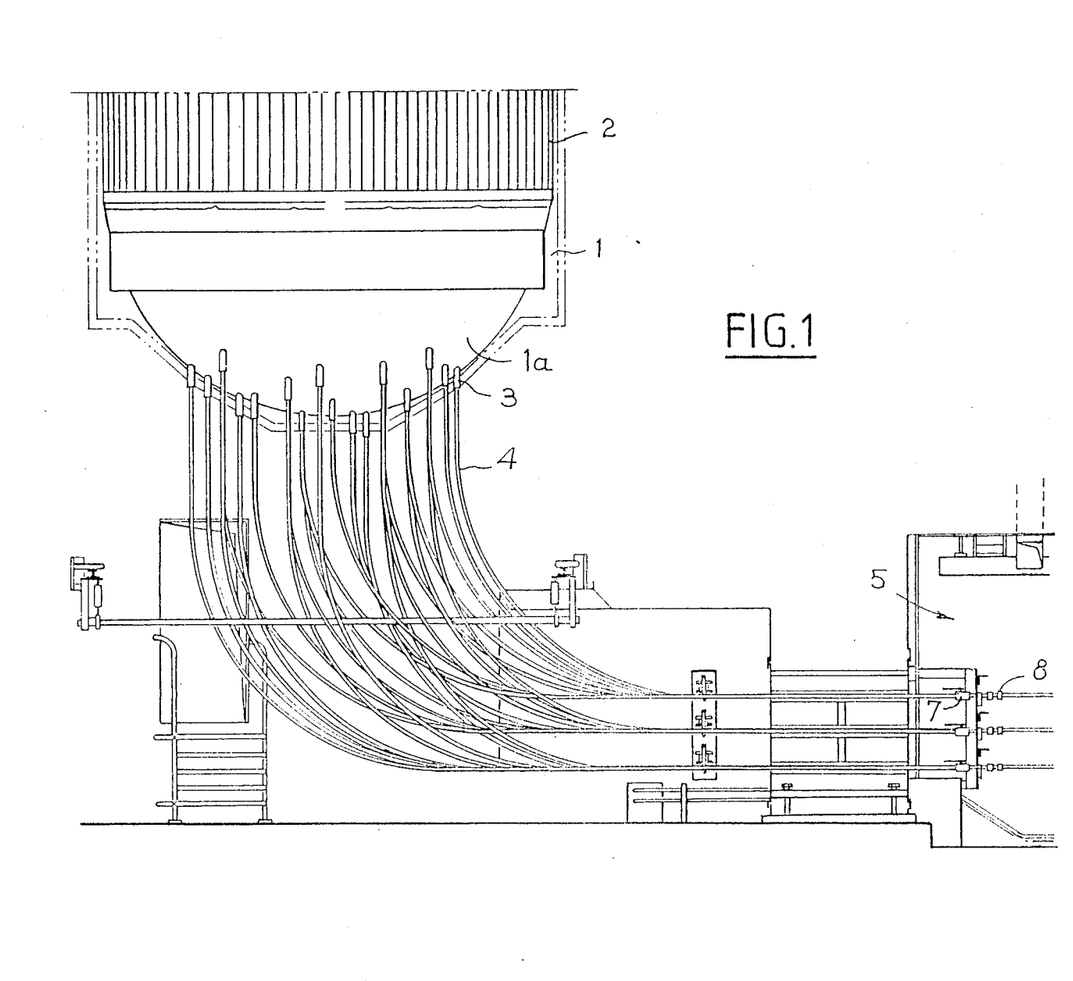
FIG. 1 is a schematic sectional and elevation view of the lower part of a vessel of a pressurized water nuclear reactor and of an instrumentation room arranged at the side and in the vicinity of the bottom of the vessel.

FIG. 1 shows the vessel bottom 1a of the vessel 1 of a pressurized water nuclear reactor enclosing the reactor core 2 consisting of fuel assemblies. Passing through the bottom 1a of the vessel are sleeves 3, to each of which a tube 4 is connected, permitting the guidance of a measurement conduit. The guide tubes 4 are curved and are then directed in the form of successive horizontal sheets towards an instrumentation room 5 arranged at a level below the level of the vessel bottom 1a and at the side relative to the vessel 1. Each of the guide conduits 4 enters the instrumentation room 5 and is then connected to an isolation valve 7 and to a sealing nozzle 8 in succession.

The valve 7 allows the end of the guide tube 4 to be closed in a completely leakproof manner when the corresponding measurement conduit has been completely withdrawn.

The nozzle 8 comprises sealing devices allowing a leakproof and sliding passage of the corresponding measurement conduit 10.

In FIG. 1, the sealing nozzles 8 have been shown in a diagrammatic and simplified manner and will be described in greater detail in the rest of the description.

Figure 2:
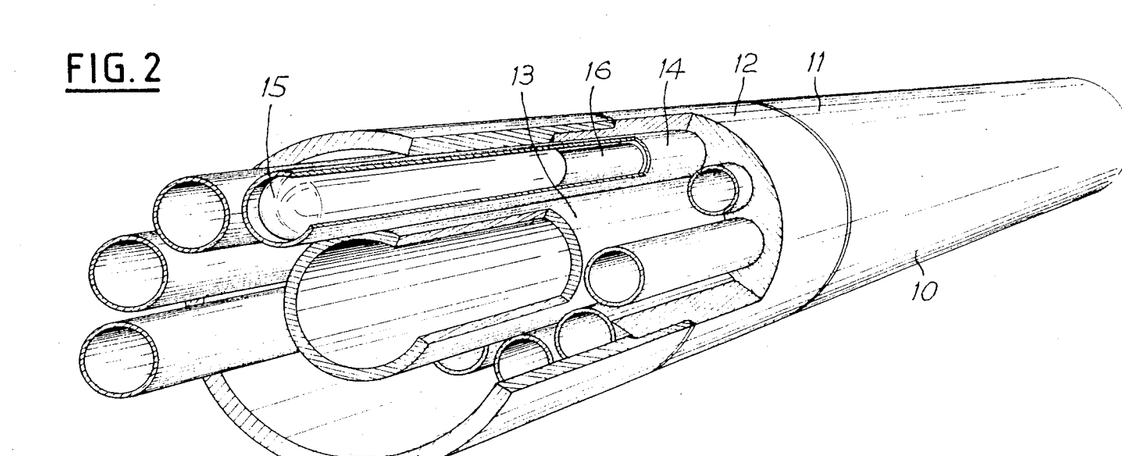
FIG. 2 is a perspective view of a part of a measurement conduit of a device according to the invention.

FIG. 2 shows a part of a measurement conduit 10 which comprises an outer tubular enclosure consisting of lengths of flexible metal tubes 11 assembled end to end by means of spacers such as 12 providing the support and the positioning of the central sheath 13 and of the peripheral sheaths 14 arranged inside the measurement conduit 10 and receiving the measuring probes.

The central sheath 13 is arranged along the axis of the measurement conduit 10; this sheath is made in the form of a thimble capable of withstanding the pressure of the reactor's primary fluid, that is to say a tubular enclosure closed at its end intended to enter the core of the nuclear reactor A neutron measurement probe, not shown, can be moved inside the central conduit 13 by pushing or pulling a measurement and movement cable which is connected to it.

The peripheral sheaths 14 are also made up in the form of thimbles capable of withstanding the pressure of the primary fluid. These sheaths consist of capillary tubes whose internal diameter is of the order of 1.5 mm, the internal diameter of the central sheath 13 being less than 5 mm.

Ten sheaths 14 have been placed at the periphery of the central conduit 13. Each of the sheaths 14 receives a measuring probe 15 fastened to the end of a cable 16 which can be a coaxial cable responsible for the transmission of the measurement signals and for the movements of the probe 15 inside the sheath 14.

The sheaths 14 are placed around the central conduit 13 in a helical arrangement with a very long pitch corresponding to the length of the curved part in the guide tubes. To give an example, with a radius of curvature of 2,500 mm, the pitch of the sheaths 14 is fixed at 3,927 mm. This arrangement of the sheaths 14 following a helical motion makes it possible to balance the traction and compression forces due to the changes in length during the curving.

When the measurement conduit 10 is placed in the core of the reactor in operation, it comes into contact with the pressurized primary fluid (320° C. and 155 bars) both with its inner part and with its outer surface.

The sheaths 13 and 14 are therefore subjected to the pressure of the primary fluid, but these sheaths of small diameter comprising a wall of relatively high thickness are capable of withstanding this pressure; the measurement conduit unit 10 remains sufficiently flexible, nevertheless, to be capable of being moved inside the guide tubes 4 of the reactor.

Figure 3:
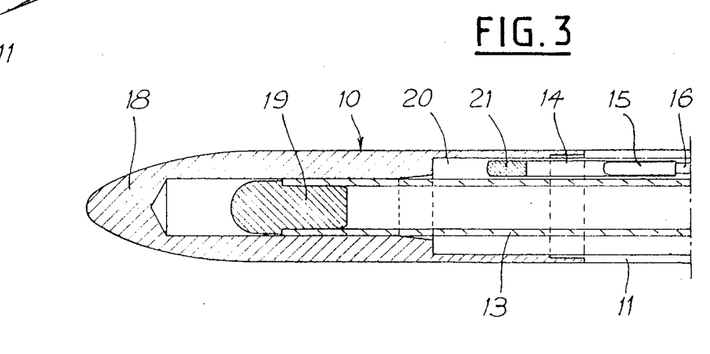
FIG. 3 is a view in axial section of the end of a measurement conduit of the device according to the invention.

FIG. 3 shows the end of the measurement conduit 10 consisting of a bullet-shaped closure 18 to which is fastened the flexible tubular length 11 situated at the front end of the conduit 10. The bullet shape makes it possible to facilitate the entry and the movement of the measurement conduit 10 inside the corresponding guide tube 4 and inside the internal equipment of the vessel and of the guide tube of the fuel assembly.

The end part 18 of the conduit 10 preferably comprises through passages bringing the inner part of the measurement conduit into communication with the outer medium consisting of the pressurized water when the measurement conduit is introduced into a guide tube of the reactor in operation.

The central sheath 13 is closed in a leakproof manner by a plug 19 welded onto the sheath 13, which thus forms a thimble in which a neutron measurement probe can be moved throughout the height of the core, when the measurement conduit is in place inside the corresponding fuel assembly.

The peripheral sheaths 14 are held in the passages 20 in an axial direction of the component 18 so that the end 21 can move relative to the sheath 10 because of the movements caused by the expansion of the materials.

Each of the sheaths 14 is closed in a leakproof manner at its end by a welded plug 21.

A measuring probe 15 connected to the end of a coaxial measurement and movement cable 16 can be moved inside the sheath 14, throughout its length, and can be placed in any position along the length of the measurement conduit 10.

Figure 4:
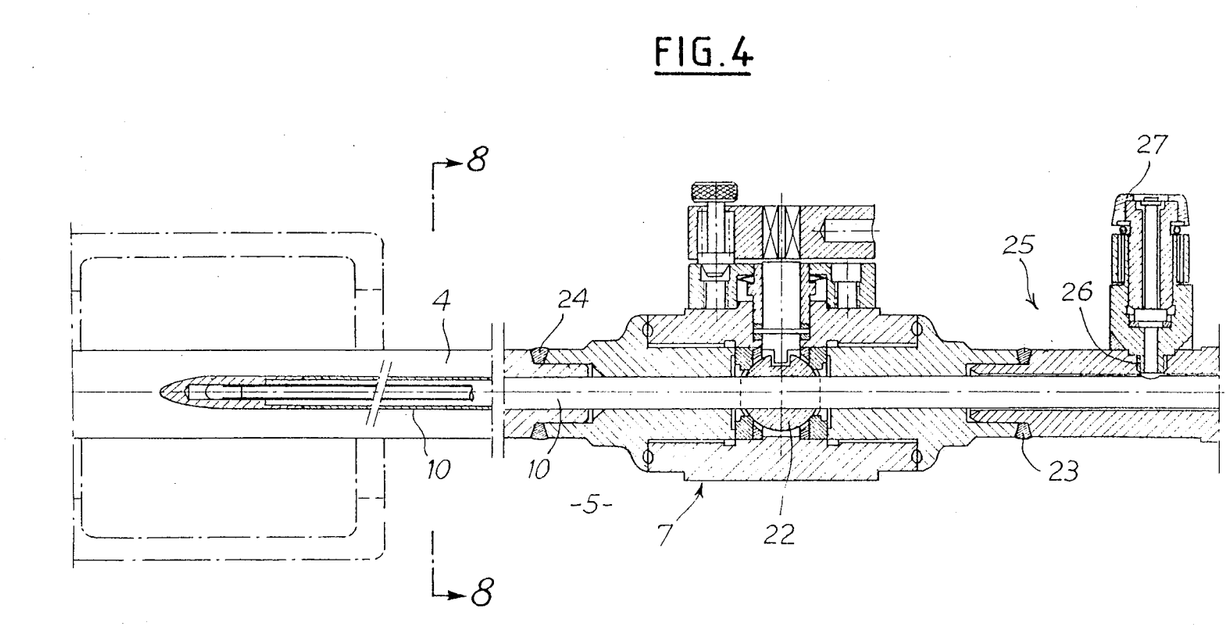
FIG. 4 is a sectional view of the front part of the sealing nozzle of a device according to the invention.

FIG. 4 shows the end of the guide tube 4 entering the instrumentation room 5 and connected to the end of a sealing nozzle 25 by means of the isolation valve 7 comprising a spherical gate 22.

The measurement conduit 10 introduced into the inner bore of the tube 4 has an outer diameter which is slightly smaller than the bore diameter of the tube 4, and this permits an axial movement of the measurement conduit for its positioning in the core of the reactor.

The front part of the nozzle 25 is fastened by a weld 23 to the body of the valve 7, which is itself fastened by a weld 24 to the end of the tube 4.

In the front end part of the nozzle an opening 26 is provided, in which a plug 27 is fastened, allowing a counterpressure to be applied in the guide tube while the measurement conduit 10 is being dismantled.

Figure 8:
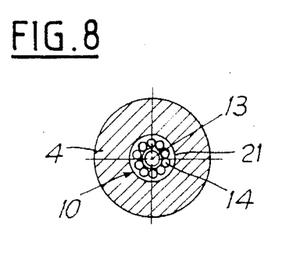
FIG. 8 is a view in cross-section along line 8—8 of FIG. 4.

As can be seen in FIG. 8, the inner bore 21 of the tube 4 allows a passage, with clearance, of the running part of the measurement conduit 10 containing the central sheath 13 and the capillary peripheral sheaths 14.

Figure 5A:
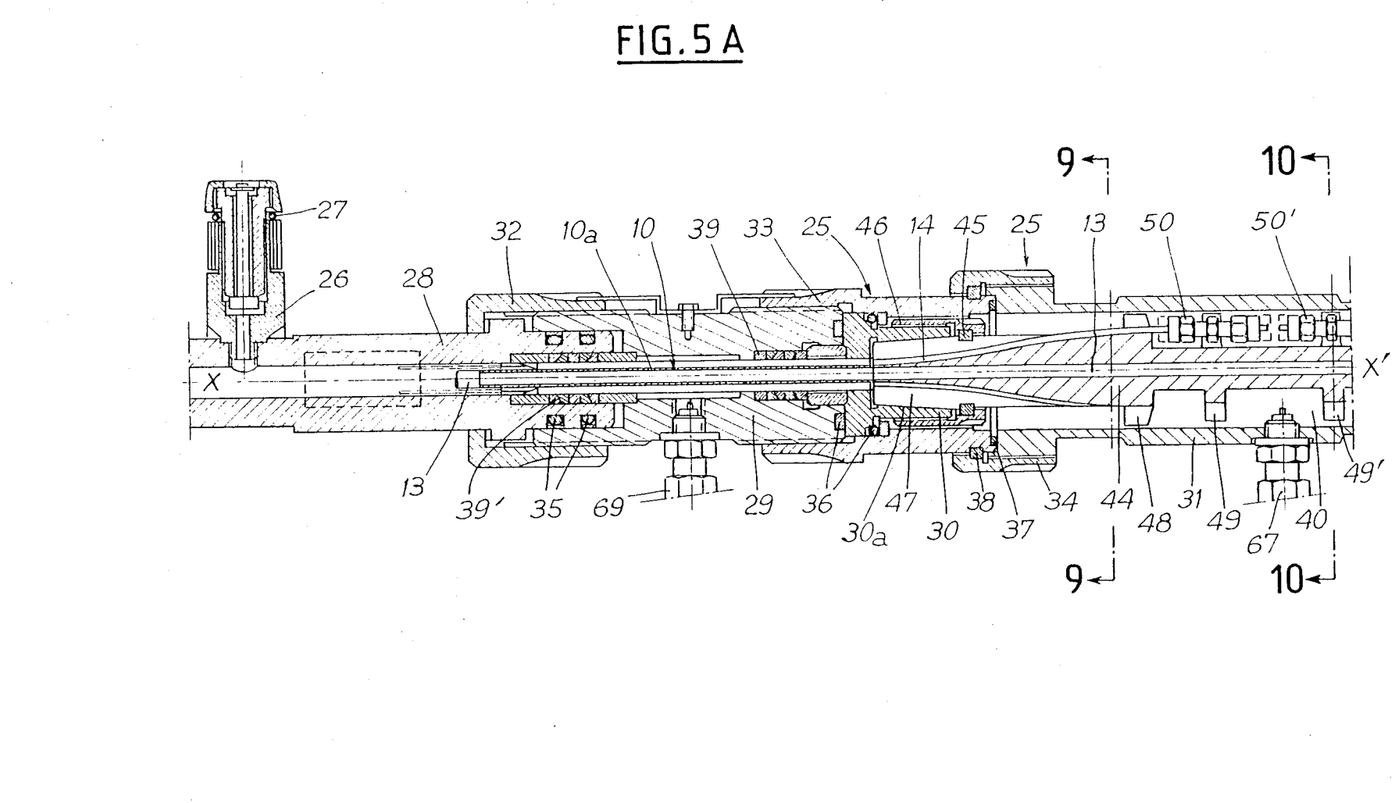
FIGS. 5A and 5B are sectional views of two successive lengths of the rear part of the nozzle exit of a device according to the invention.
Figure 5B:
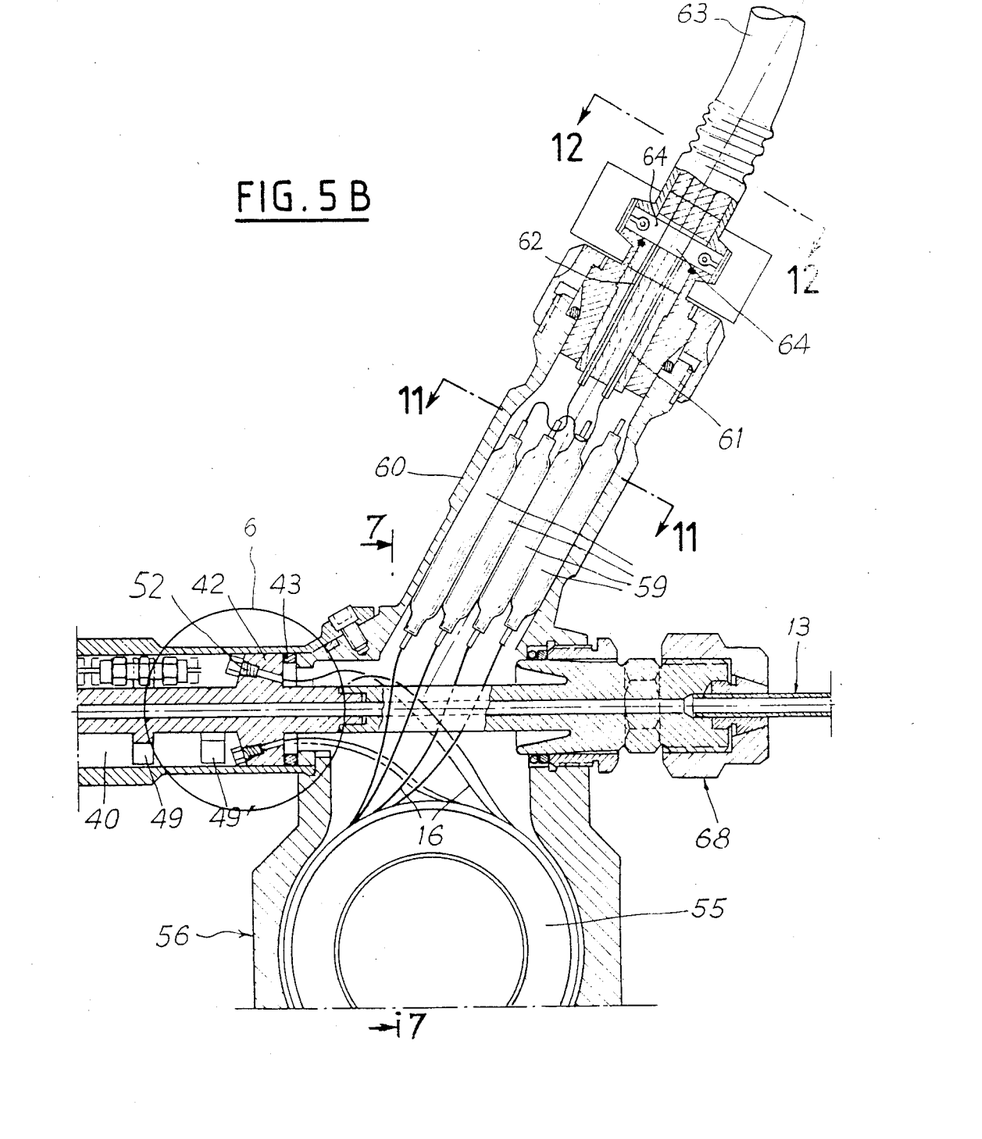
Figure 9:
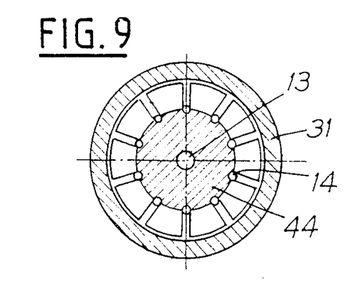
FIG. 9 is a view in cross-section along line 9—9 of FIG. 5A.
Figure 10:
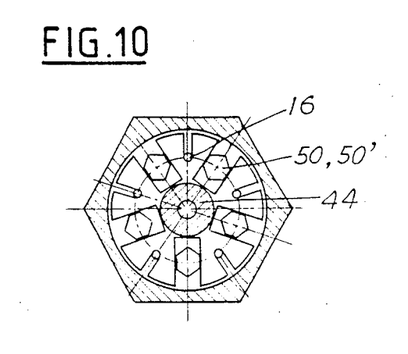
FIG. 10 is a view in cross-section along line 10—10 of FIG. 5A.

In general, as can be seen in FIGS. 5A and 5B and in FIGS. 9 and 10, the sealing nozzle 25 consists of a tubular body made of a number of successive parts 28, 29 and 31, assembled together by means of knurled nuts 32, 33 and 34 and of keying rings in two parts such as 38.

A fitting of this kind makes it possible to provide the nozzle 25 with a perfect demountability, for access to its central part containing the rear end part of the measurement conduit 10.

The front part 28 of the nozzle is assembled onto the intermediate part 29 by virtue of the nut 32, with insertion of seals 35. The nuts 33 and 34 and the keying ring 38 are responsible for the assembly of the intermediate part 29 and of the rear part 31 whose cross-section, shown in FIGS. 9 and 10, has some parts of hexagonal shape.

The rear part of the conduit 10 is integrally attached to a bell-shaped component 30 comprising a frustoconical inner bore 30a.

The component 30 also comprises two seal bearings for seals 36 which are inserted between the component 30 and the parts 29 and 33 of the nozzle 25, respectively.

Seals 39 and 39' are fitted inside the bore of the components 28 and 29 of the nozzle 25 respectively and permit a sliding and leakproof fitting of the conduit 10 inside the nozzle.

The rear end part 10a of the measurement conduit 10 consists of a component which in its middle part defines a bore in which the central sheath 13 is fastened in a leakproof manner by welding and peripheral slots for each of the sheaths 14 which are introduced into this housing and are then covered by welding. The outer surface of the component 10a, filled by welding, is then machined so as to form a smooth sealing surface interacting with the seals 39, 39'.

When the measurement conduit 10 is in place in a guide tube 4 of the reactor in operation, pressurized water fills the inner bore of the guide tube 4 and the inner bore of the conduit 10.

The front inner part of the nozzle 25, as far as the component 30, containing pressurized water, is completely isolated from the rear inner part of the nozzle 25 by means of the seals 39, 39' and 36.

In its inner part, the component 31 of the nozzle 25 defines a chamber 40 which is isolated by means of the seals 36 from the part subjected to the pressure of the primary fluid.

Moreover, the chamber 40 is isolated from the external environment, that is to say from the instrumentation room, by a closure 42 which will be described with reference to FIG. 6.

The chamber 40 encloses a carrier component 44 integrally attached to the rear end 10a of the measurement conduit by means of the bell-shaped component 30. The end of the carrier component 44, frustoconical in shape, is engaged inside the bore 30a of the component 30 and assembled onto this component 30 by means of a keying ring in two parts 45 and of a nut 46. The component 44 is pierced in its central part and throughout its length to form a bore for the central sheath 13 to pass through. In its rear frustoconical part, the carrier component 44 also comprises ten peripheral slots 47 inclined relative to the axis XX' of the measurement conduit, in each of which is engaged a peripheral sheath 14 whose path, from the end part 10a of the conduit 10, through the component 30 and then through the end of the carrier 44, moves away from the axis XX' of the conduit 10 to reach, at the periphery, an opening passing through an annular part 48 of the carrier 44.

The carrier 44 carries, by means of two annular parts 49 and 49', two series of five sealing devices 50, 50', in each of which is engaged the end of a peripheral sheath 14.

Each of the sealing devices 50, 50' permits the leakproof and sliding exit of a cable 16 carrying at its end a measuring probe 15 engaged in a peripheral sheath 14 of the measurement conduit 10.

Figure 6:
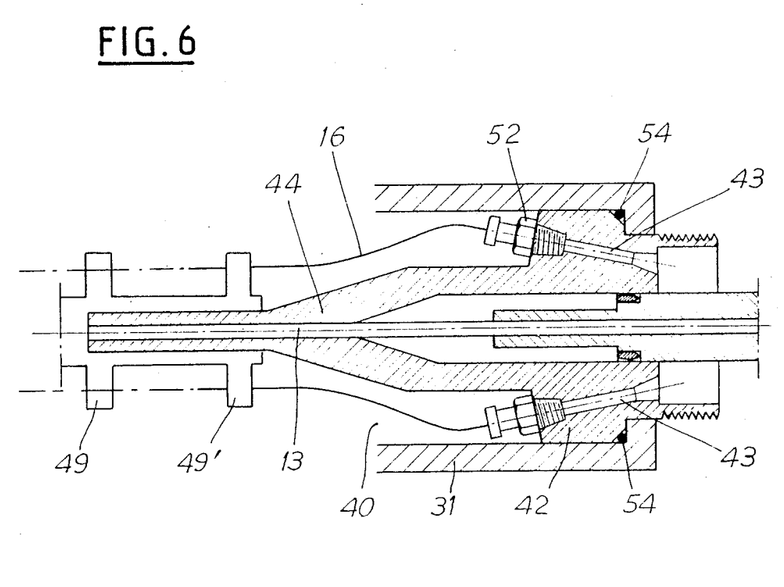
FIG. 6 is an enlarged view of the detail 6 of FIG. 5B.

At the exit of the sealing device 50 or 50', the cable 16 is engaged in a leakproof passage device 52 fastened onto the component 42, in the extension of a passage channel 43, as can be seen in FIG. 6.

The component 42 is fastened in a leakproof manner, by virtue of a ring seal 54, inside the component 31 defining the chamber 40. The component 42 is thus responsible for the leakproof closure of the chamber 40.

In its middle part, the component 42 is pierced with a bore in which the central sheath 13 is fastened in a leakproof manner. The component 42 is, furthermore, pierced at its periphery to form the ten passage channels 43 which are slightly inclined relative to the axis XX' of the conduit 10.

At the entry of each of the channels 43, towards the inside of the chamber 40, a sealing device 52 is fastened, permitting a leakproof and sliding passage of a measurement and movement cable of a probe 16.

As can be seen in FIGS. 5A, 5B, 6 and 7, on leaving the chamber 40, each of the cables 16 is wound onto a storage reel 55 mounted in a carrier 56 integrally attached to the rear end of the nozzle 25.

Figure 7:
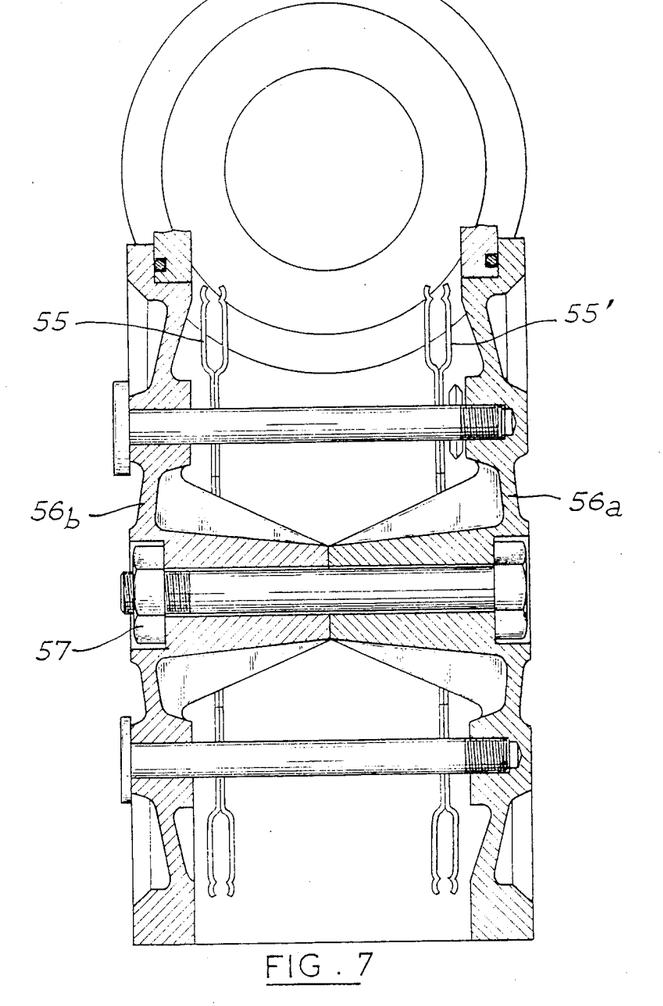
FIG. 7 is a view in section along line 7—7 of FIG. 5.

The carrier 56 forms a case in which the ten reels, each receiving a cable 16 of a measuring probe, are mounted on the same single shaft.

FIG. 7 shows the side plates 56a, 56b of the case 56, fastened onto the end of the nozzle 25 and carrying the shaft 57 common to the set of the reels 55 which, on their peripheral part, comprise a groove permitting the storage of a certain length of cable 16.

At the exit of the corresponding storage reel 55, each of the cables 16 is engaged in a leakproof passage device 59 housed in an oblique extension 60 of the case 56.

Figure 11:
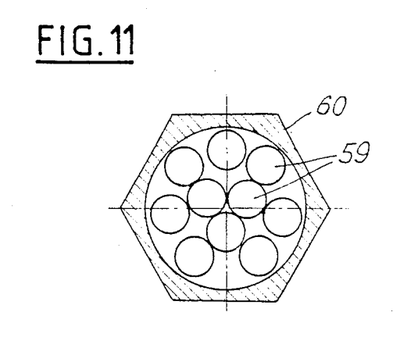
FIG. 11 is a view in section along line 11—11 of FIG. 5B.

FIG. 11 shows the arrangement of the leakproof passages 59 inside the oblique part 60 of the case 56.

At the exit of the leakproof passages 59, each of the cables 16 is connected to a plug 61 passing through an isolating component 62 and projecting at the end of the oblique part 60 of the case closed by the isolating component 62.

Figure 12:
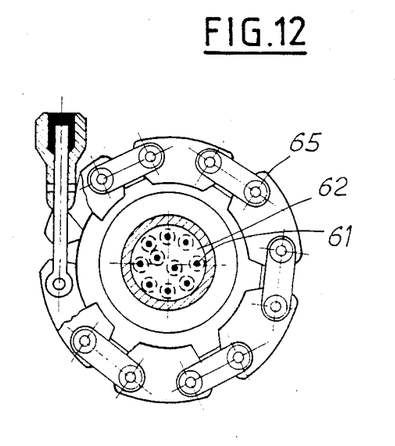
FIG. 12 is a view in section along line 12—12 of FIG. 5B.

The connection of the said plugs 61 may be ensured by employing an electrical connecting device 63 having ten outlets 64 which may be engaged into the plugs 61. The electrical connecting device 63 is connected in a leakproof manner to the end of the oblique extension 60, by means of a quick coupling with a chain 65, shown in FIG. 12.

The rear part 68 of the case 56 forms a leakproof exit for the central sheath 13.

The sealing devices 50, 50' and 52 consist of commercial devices sold under the trade name "Swagelok". Such miniaturized devices consist of frustoconical components in leakproof contact with one another and permitting the leakproof and sliding passage of the cables 16 which are engaged in these sealing devices.

The measuring probes fastened to the end of the cables 16 whose outer diameter is substantially equal to that of the corresponding measurement and movement cable are also capable of passing through the sealing devices when a probe is reengaged inside a capillary peripheral sheath.

The storage of a certain length of cable 16 on the corresponding reel 55 inside the case 56 makes it possible to employ standard hardware whatever the position of the guide tube relative to the bottom of the vessel and whatever the definitive position of the probe in the core of the nuclear reactor.

In fact, in the case of a pressurized water nuclear reactor, with an electrical power of 900 or 1,300 MW, the measurement conduits which are from fifty to sixty in number in the case of the core assembly are of different lengths, depending on the position of the assemblies in which the measurements are carried out. Furthermore, the measuring probes, particularly the neutron flux measurement probes, may be placed at variable heights between the base and the top of the core.

It follows from this that the length of the measurement cable of the probes is essentially variable, the difference in length between the shortest measurement cable and the longest measurement cable being of the order of 7 m.

The device according to the invention, comprising storage reels for extra lengths of cables permits the use of probes having a cable of standard length corresponding to the maximum length for placing the most distant probe in the core.

When the measurement conduit 10 is brought into service, it is introduced into the nozzle, and then into the guide tube and the reactor core without the measuring probes. The conduit is equipped with its measuring probes after it has been placed in position in the core. Each of the probes may be placed in a highly accurate manner at a determined height in the core. The length of the cable 16 which is unwound into the guide tube can be measured to determine and monitor the position of the probe.

In the event that a probe is faulty, it can be withdrawn without the need to dismantle the measurement conduit. To do this, it suffices to separate the case 56 and the component 31 from its nozzle 25 and to apply a pull to the end of the cable 16.

The replacement of a unit consisting of the probe 15, its cable 16, the storage reel 55 and the corresponding sealing device 59 is carried out. The probe 15 is engaged in the measurement conduit by means of the component 42 in the channel 43 and the leakproof passage device 52 permits a passage into the chamber 40. The probe and its cable 16 are then engaged in the corresponding sealing device 50 or 50', and this makes it possible to introduce the probe 15 and the cable 16 inside the corresponding capillary sheath 14. A monitored forward movement of the probe is then performed until the time when this probe occupies its position in the core. The position monitoring may be carried out merely by monitoring the length of the cable 16.

Obviously, as in the devices according to the prior art, the measurement conduit 10 can be withdrawn completely from the core by pulling its end component 44, after dismantling of the nozzle 25. During the movement of the measurement conduit, the sealing is maintained at the periphery of this conduit by the seals 39 and 39' of the part of the nozzle 25 remaining integrally attached to the guide tube 4.

This operation of withdrawal of the measurement conduit is performed when the nuclear reactor is stopped, the vessel nevertheless remaining filled with water at ambient temperature.

When the front end of the measurement conduit 10 has been moved to a position behind the valve 7, the latter is closed to isolate the guide tube completely and to prevent the flow of primary water inside the instrumentation room.

Furthermore, when the reactor is in operation, the device according to the invention makes it possible to avoid any leakage of primary water under pressure inside the instrumentation room.

In fact, the internal space of the nozzle 25 is completely isolated from the external environment in its part receiving the pressurized primary fluid.

The chamber 40 into which the peripheral conduits 14 and the cables 16 come out is itself completely isolated both from the part of the nozzle which is subjected to the pressure of the primary fluid and from the external environment.

In normal operation, the primary fluid is stopped by the seals 36 inserted between the nozzle and the component 30 of the measurement conduit.

In the event that a peripheral sheath 14 had a crack giving rise to leakage both in its part exposed to the primary fluid and its part situated inside the chamber 40, primary fluid would flow into the chamber 40. By virtue of the presence of the sealing devices 50, 50', this primary fluid cannot, however, enter the other peripheral capillary sheaths 14. Furthermore, the sealing devices 52 prevent any leakage of primary fluid towards the outside of the chamber 40.

A leakage of this kind would be easily detected by the electrical plug 67 passing through the wall of the chamber 40.

An additional leakage detector 69, also consisting of an electrical plug passes through the wall of the component 29 of the nozzle to determine a possible presence of primary fluid between the seals 39 and 39' around the measurement conduit 10.

The device according to the invention therefore makes it possible to avoid any leakage of primary fluid into the instrumentation room and to detect the presence of fluid in certain parts of the sealing nozzle.

The invention is not limited to the embodiment which has been described.

Thus, it is possible to envisage the use of demountable sealing nozzles having a different shape and comprising a different number of components.

The sealing devices permitting the exit of the cables may be of any type permitting a sufficient miniaturization and use under the operating conditions of the reactor.

The measurement conduit can incorporate any number of probes arranged in peripheral sheaths, this number being, however, preferably 8 or 10.

Lastly, the device according to the invention applies to any nuclear reactor comprising a core in which measurements are carried out while the reactor is in operation.

I claim:

1. In a nuclear reactor system including a reactor vessel, reactor coolant, an instrumentation room, and a measuring device, said device comprising a measuring conduit inside which there is placed, in a central position and in a coaxial manner, a closed and leakproof sheath (13) for guiding a movable probe for measuring neutron flux and, in peripheral positions, a plurality of probes (15) for measuring physical parameters of the core, the measurement conduit (10) being mounted movably in a guide tube (4) connecting the reactor vessel (1) to the instrumentation room (5) which the measurement conduit enters by passing in a sliding and leakproof manner through a sealing nozzle (25) integrally attached to the end of the guide tube (4), the improvement wherein the peripheral measuring probes (15) are fastened to the end of flexible measurement and movement cables (16), and said probes are mounted movably, each inside a leakproof peripheral sheath (14), a plurality of peripheral sheaths (14) being mounted inside the measurement conduit (10) around the central sheath (13) in a helical arrangement, the nozzle (25) comprising a helical arrangement, the nozzle (25) comprising a leakproof chamber (40) isolated from the primary coolant fluid and in the instrumentation room (5), into which there open the peripheral sheaths (14) of the conduit (10), each of which comprises, at its end, a leakproof passage (50, 50') for the sliding exit of the measurement cable (16) and of the corresponding probe (15) into the chamber (40), leakproof passage devices (52) for each of the cable-probe units (15, 16) also being placed on an exit wall (42) of the chamber (40) of the nozzle (25).

2. Device according to claim 1, wherein it additionally comprises, fastened to the end of the nozzle (25) away from the guide tube (4), a case (56) carrying storage reels (55) for extra lengths of cable (16).

3. Device according to claim 2, wherein the case (56) comprises an extension which is oblique (60) relative to the axis of the conduit (10) by which the ends of the cables (16) leaving the corresponding reels (55) are connected to electrical connection plugs (62), leakproof passage devices (59) being inserted in the passage of the cables between the reels (55) and the plugs (62).

4. Device according to claim 1, wherein the nozzle (25) consists of a number of successive parts (28, 29, 31) in the axial direction (XX') of the measurement conduit (10), these various parts being connected in a demountable manner by means of nuts (32, 33, 34).

5. Device according to claim 1, wherein the rear end of the measurement conduit (10) away from its front end intended to be introduced into the core is integrally attached to a component (30) interacting with seals (36) to provide the sealing, inside the nozzle, between an internal part of this nozzle in contact with the primary coolant fluid of the reactor and the chamber (40) is isolated from the primary fluid.

6. Device according to claim 5, wherein, at its rear part, the component (30) is connected to a carrier component (44) placed inside the chamber (40) and to which the leakproof passage devices (50, 50', 52) are fastened.

7. Device according to claim 6, wherein the leakproof passage devices (50, 50') arranged at the end of each of the peripheral sheaths (13) are placed according to two units set out along the axial length of the carrier component (44).

8. Device according to claim 6, wherein the leakproof passage devices of the exit wall (42) of the chamber (40) of the nozzle (25) are inclined relative to the lengthwise axis (XX') of the measurement conduit (10) and of the nozzle (25).

9. Device according to claim 1, wherein a liquid detector (67) consisting of an electrical plug is arranged in an opening passing through the wall of the chamber (40).

* * * * *